US012290162B2

(12) United States Patent
Al-Jabry et al.

(10) Patent No.: US 12,290,162 B2
(45) Date of Patent: May 6, 2025

(54) BADGE HOLDER INCORPORATING PERSONAL SAFETY SYSTEM

(71) Applicant: KWEMA, INC., Miami, FL (US)

(72) Inventors: Ali Hassan Awadh Al-Jabry, St. Louis, MO (US); Gabriel Garcia Peralta, Estado (MX)

(73) Assignee: Kwema, Inc., Miami, FL (US)

( * ) Notice: Subject to any disclaimer, the term of this patent is extended or adjusted under 35 U.S.C. 154(b) by 0 days.

(21) Appl. No.: 17/354,790

(22) Filed: Jun. 22, 2021

(65) Prior Publication Data

US 2022/0007822 A1 Jan. 13, 2022

Related U.S. Application Data

(60) Provisional application No. 63/042,335, filed on Jun. 22, 2020.

(51) Int. Cl.

| | |
|---|---|
| ***G08B 25/01*** | (2006.01) |
| ***A45F 5/00*** | (2006.01) |
| ***G09F 3/20*** | (2006.01) |

(52) U.S. Cl.

CPC .............. *A45F 5/004* (2013.01); *G09F 3/207* (2013.01); *A45F 2005/006* (2013.01); *A45F 5/1516* (2025.01); *A45F 5/155* (2025.01)

(58) Field of Classification Search

CPC .... A45F 5/004; A45F 5/021; A45F 2005/006; A45F 2003/003; A45F 2005/002; A45F 5/1558; G09F 3/207; G08B 21/02; G08B 25/016; G08B 25/10; G08B 15/004; A44C 3/001; G07C 9/28

See application file for complete search history.

(56) References Cited

U.S. PATENT DOCUMENTS 6,215,396 B1 * 4/2001 Script .................... G08B 13/08 340/548
6,624,754 B1 9/2003 Hoffman et al.

(Continued)

FOREIGN PATENT DOCUMENTS

GB 2571758 A 9/2019
WO 2017025783 2/2017

OTHER PUBLICATIONS

International Search Report and Written Opinion in PCT/US21/38500, mailed Oct. 20, 2021.

(Continued)

*Primary Examiner* — Adam J Waggenspack

(74) *Attorney, Agent, or Firm* — Lewis Rice LLC

(57) ABSTRACT

A personal emergency notification system which is incorporated into a badge holder or similar item. This allows for a user to have an emergency notification system attached to a badge, keycard, or other similar access pass that a user will otherwise need to have on their person at work or in another specific environment but otherwise is not necessary. Further, the system can have various automatic features when an emergency is detected in the work area, the system may also be able to recognize when the user is on site, near the site (e.g. in a mustering area or rally point), or offsite and safe. These automatic features may also be used during an evacuation drill to obtain valuable data on area evacuation.

6 Claims, 4 Drawing Sheets

(56) References Cited

U.S. PATENT DOCUMENTS

| | | | | |
|---|---|---|---|---|
| 6,650,239 | B1 * | 11/2003 | Hron | G08B 13/2491 340/564 |
| 6,807,564 | B1 | 10/2004 | Zellner et al. | |
| 7,414,539 | B2 * | 8/2008 | Sakai | G08B 13/08 116/85 |
| 8,249,547 | B1 | 8/2012 | Fellner | |
| 8,393,541 | B2 * | 3/2013 | Naumovsky | G06Q 30/08 235/462.31 |
| 8,742,924 | B2 * | 6/2014 | Eisenman | G08B 13/22 340/539.13 |
| 9,137,648 | B2 * | 9/2015 | Panttaja | H04M 1/7243 |
| 9,503,835 | B2 | 11/2016 | Fleck et al. | |
| 9,646,473 | B2 | 5/2017 | Ros | |
| 9,704,366 | B2 | 7/2017 | Aswath et al. | |
| 9,728,062 | B2 | 8/2017 | Chang | |
| 9,922,537 | B2 | 3/2018 | Shah et al. | |
| 10,028,120 | B2 * | 7/2018 | Eisenman | G08B 25/016 |
| 10,147,304 | B1 * | 12/2018 | Lazarski | G08B 21/0269 |
| 10,777,073 | B2 * | 9/2020 | Fontanili | G08B 25/016 |
| 10,881,326 | B1 * | 1/2021 | Burgos-Rivera | G08B 25/016 |
| 11,298,572 | B2 * | 4/2022 | Dillon | A62B 35/0075 |
| 11,348,484 | B2 * | 5/2022 | Wyatt | G09F 3/207 |
| 11,439,370 | B2 * | 9/2022 | Bongiorno | A61B 5/7475 |
| 2004/0188557 | A1 | 9/2004 | Raia et al. | |
| 2007/0051842 | A1 * | 3/2007 | Pryor | A45F 5/004 242/378.3 |
| 2008/0265082 | A1 | 10/2008 | Angiuli | |
| 2009/0322513 | A1 | 12/2009 | Hwang et al. | |
| 2010/0328063 | A1 | 12/2010 | Derrick et al. | |
| 2011/0037599 | A1 | 2/2011 | Johnson, Jr. et al. | |
| 2013/0078942 | A1 | 3/2013 | Owens et al. | |
| 2016/0240075 | A1 | 8/2016 | Eisenman | |
| 2016/0338642 | A1 | 11/2016 | Parara et al. | |
| 2017/0215033 | A1 | 7/2017 | Piraino et al. | |
| 2017/0365160 | A1 | 12/2017 | Aurbach et al. | |
| 2017/0372188 | A1 | 12/2017 | Simon et al. | |

OTHER PUBLICATIONS

Extended European Search Report in EP21827903.2, mailed Sep. 16, 2024, 14 pages.

Partial Supplementary European Search Report in 21827903.2, dated Jun. 24, 2024, 15 pages.

* cited by examiner

BADGE HOLDER INCORPORATING PERSONAL SAFETY SYSTEM

CROSS REFERENCE TO RELATED APPLICATION(S)

This application claims the benefit of U.S. Provisional Patent Application Ser. No. 63/042,335, filed Jun. 22, 2020, the entire disclosure of which is herein incorporated by reference.

BACKGROUND OF THE INVENTION

Field of the Invention

The present disclosure relates to systems and methods for providing personal safety devices in the form of emergency notification systems. These systems provide for easy adoption by the incorporation of the emergency notification system into a badge holder.

Description of the Related Art

Personal security and safety has been an issue for humanity for as long as can be remembered. In most cases, the universal form of safety is to carefully choose actions and be careful. However, regardless of how careful one is, there are always emergency situations where help is needed. In these situations, there is a need to call others for that help. For the vast majority of human history, this ability was limited by the range of the voice or the speed one could walk or ride a horse. However, in the modern world with the adoption of the telephone in the home and business and the creation of emergency 911 (E911) services, the ability to call for help suddenly gained much greater range and accessibility. Further, specialized emergency vehicles allowed trained individuals such as emergency medical technicians, police officers, and fire fighters to arrive at the emergency quickly, well-prepared, and ready to assist.

While E911 services provide huge benefits for safety and emergency response, they still have problems. Before mobile phone technology became ubiquitous, E911 calls were confined to the homes and business where telephones were located. With the creation of cellular and remote communication technologies, these services suddenly became more portable. However, at the same time, mobile phone technology did not solve all the problems. While E911 service is typically available from mobile phones, locating the calling phone can be difficult which can make delivery of those services to the caller difficult.

Further, mobile phones are designed for many purposes and, even with attempted simplification, making an E911 call from one can be difficult in an emergency situation. Thus, E911 services often require the individual needing them to be safe or in the care of another for the E911 call to be made. Because of this, while E911 service on mobile phones is incredibly valuable, it does not fill all needs for personal safety in the event of personal emergency.

Individuals that are alone and faced with an emergency situation often have little time to react before they can no longer seek assistance. Further, they may be in increased danger if they have to manipulate a complicated device or scroll through a menu to locate what they need. Further, some that are in need of assistance may be unable to react much at all because they are incapacitated, not in complete control of their bodies, or unconscious. For these reasons, portable personal emergency devices have become commonly available. These are typically in the form of a small transmitter with a prominent button that is carried with the user and can be activated in an emergency situation. They are often placed on a bracelet or a necklace to make them easy to carry and initiate communication to specific types of emergency operators depending on their purpose.

There are a wide number of these types of devices available such as is discussed in U.S. Pat. No. 6,624,754, the entire disclosure of which is herein incorporated by reference. The devices encompass a wide variety of connection technologies as well as location technologies and other related technologies to provide for simple use, effective emergency response, and efficient operation. While these devices are undoubtedly useful, they have a couple of universal problems.

In the first instance, they are almost always designed to be obvious emergency systems. This is usually a feature and not a bug, but in many circumstances people are unwilling to carry an emergency device that is only useful in emergencies. They may see having it as being weak, may be in a situation where having such a device could actually place them in additional danger, or may simply be unwilling to devote the amount of body space necessary to carry it. Even items such as wristbands and necklaces can take a long time to get used to wearing on a regular basis.

Another problem with adoption of personal emergency systems is that some of them are only necessary in certain circumstances. For example, certain personal emergency systems are highly useful when people are at work but not when they are at home or out on their own. For example, for those who work in higher risk environments (such as for example, around a risk of chemical exposure), it can be helpful for them to have a personal emergency notification system while at work, but it will typically not be useful for them in any other environment as they are at a much lowered risk. Making sure that such systems are adopted leads to difficulties. The concern is that people who are not used to having a personal emergency notification system with them before work may forget to bring it with them to work. Further, even if people remember to bring their system, they may forget where they have it when they need it. They may also not carry it in an intended fashion as it is uncomfortable for them. As an example, they may leave it at a desk, in a purse, in a pocket, or somewhere that is not with them and easily accessible when they need it.

Further, while work based systems can be very valuable when the associated individual is at work, if they are active outside of work they can create problems. As a simple example, if one has an emergency system which they take with them to an offsite lunch, and it then detects an emergency call, the emergency system may not know where the individual is. Because of such a concern, it can be desirable to make sure that a system designed for emergency notification at work is used only at work.

Thus, there is a need in the art to provide for a personal emergency system for emergency notification, tracking, and safety that is easily transported and readily adopted by those at work while being something that they readily do not need to have with them when they are not at work. The system needs to be adapted to associate directly with items that are already needed for work, is readily carried with the individual, and is typically kept by the individual in a repeatable position on their body so they know where it is when they need it. Further, the system will also ideally be adapted to operate in and around the work environment.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein is a personal emergency notification system which is incorporated into a badge holder or similar item. This allows for a user to have an emergency notification system attached to a badge, keycard, or other similar access pass that a user will otherwise need to have on their person at work or in another specific environment but otherwise is not necessary. Further, as these types of access passes are well recognized and accepted as a necessity of many forms of work, and are commonly prominently positioned on the person. Providing an emergency notification system that is intimately associated with these types of passes provides that the system is readily available to the user whenever they have the pass, which will commonly be whenever they are at work and would need the emergency notification system. Further, as the system can have various automatic features when an emergency is detected in the work area, the system may also be able to recognize when the user is on site, near the site (e.g. in a mustering area or rally point), or offsite and safe. The system may also store data from evacuation drills which may be used to improve evacuation during an actual emergency.

Described herein, among other things, is a badge holder comprising: a clip for attaching said badge holder to a badge; a reel for allowing said clip to be moved away from said badge holder and automatically retracted toward said badge holder; and an emergency notification system including: a communication system for indicating a position of said badge holder; and an activation object for activating said emergency notification system.

In an embodiment of the system, the activation object is manually operated.

In an embodiment of the system, the activation object is a mechanical button.

In an embodiment of the system, the activation object is an indicator

In an embodiment of the system, the activation object is a sensor.

In an embodiment, the system further comprises a housing having multiple layers.

In an embodiment of the system, the housing has three layers.

In an embodiment of the system, the reel is in a different layer to said emergency notification system.

In an embodiment, the system further comprises a badge sleeve on said clip.

There is also described herein, in an embodiment, a method for automating roll call during an evacuation, the method comprising: providing each of a plurality of individuals to be evacuated with a badge holder including an emergency notification system prior to them being evacuated from a structure; during an evacuation of said structure, having said individuals acknowledge recognition of said evacuation by triggering an indicator on said badge holder; as said badge holders reach a rally point, said emergency notification system automatically indicating to a central server that said badge holder has reached said rally point; and indicating on a roll call that each individual provided with said badge holder which has reached said rally point, has reached said rally point.

In an embodiment of the method, the central server obtains information from a prior evacuation drill to determine expected paths of said individuals.

In an embodiment of the method, the central server obtains information from a prior evacuation drill to determine expected time for each individual to reach said rally point.

In an embodiment of the method, the rally point comprises rally point outside said structure.

In an embodiment of the method, the rally point comprises rally point inside said structure.

There is also described herein, in an embodiment, a method for capturing data related to an evacuation drill, the method comprising: providing each of a plurality of individuals to be evacuated with a badge holder including an emergency notification system prior to them being evacuated from a structure; during an evacuation drill of said structure, having said individuals acknowledge recognition of said evacuation by triggering an indicator on said badge holder; tracking a path of said individuals during said evacuation drill; as said badge holders reach a rally point, said emergency notification system automatically indicating to a central server that said badge holder has reached said rally point; indicating on a roll call that each individual provided with said badge holder which has reached said rally point, has reached said rally point; determining a time from said triggering of said indicator to said badge holder reaching said rally point; and storing data on said path and said time for each said individual.

In an embodiment of the method, the central server uses said stored data during a later evacuation.

In an embodiment of the method, the rally point comprises rally point outside said structure.

In an embodiment of the method, the rally point comprises rally point inside said structure.

In an embodiment of the method, the stored data is used to decrease time for at least one of said individuals to reach said rally point during a later evacuation drill.

DETAILED DESCRIPTION OF THE PREFERRED EMBODIMENT(S)

Figure 3:
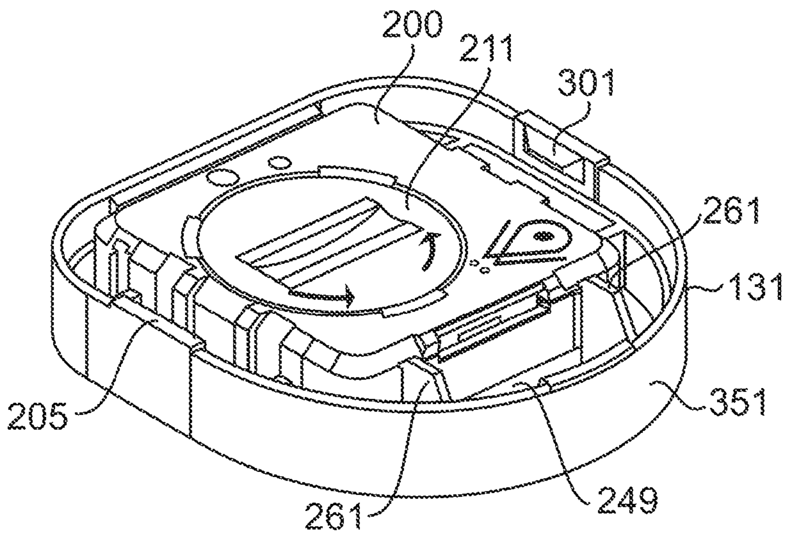
FIG. 3 provides a perspective view of the third layer of a badge holder incorporating an emergency notification system in a retractable badge reel.
Figure 4:
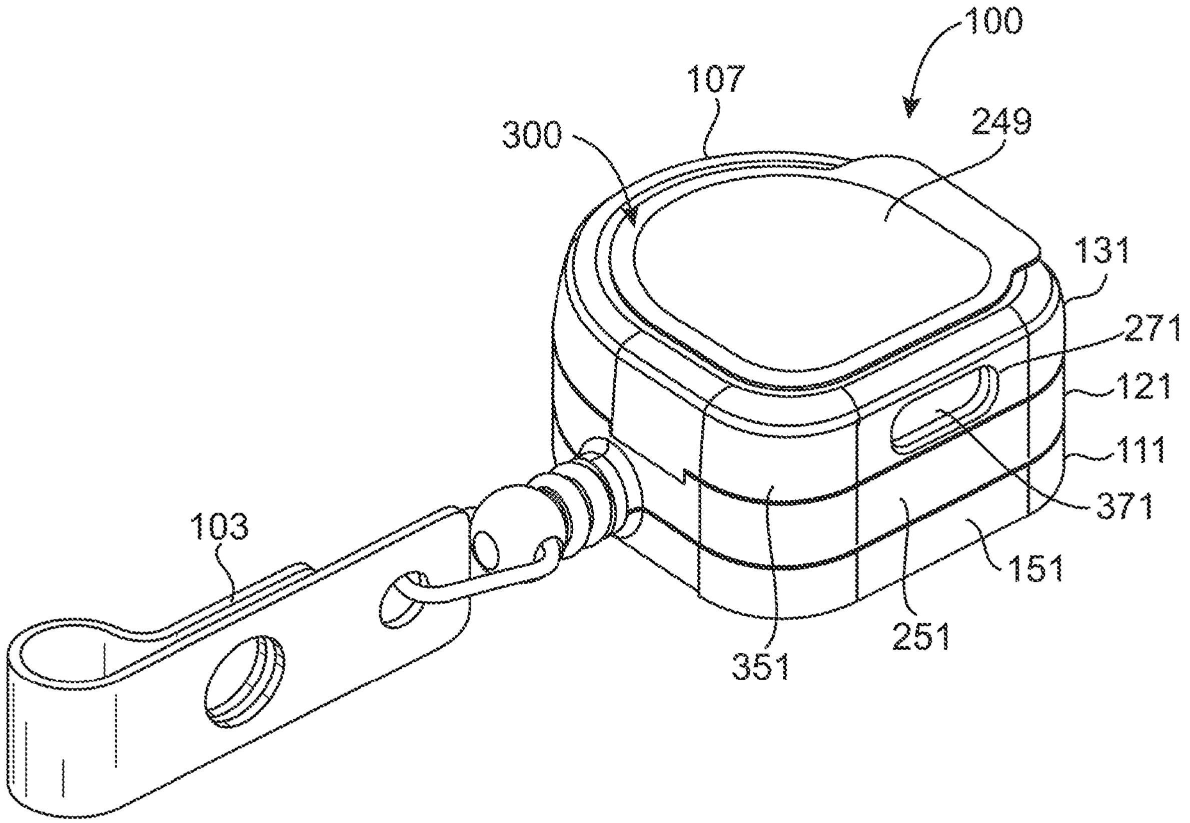
FIG. 4 provides a perspective view of the assembled badge holder from FIGS. 1, 2, and 3.
Figure 5:
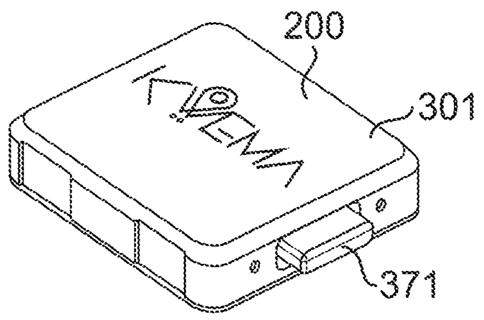
FIG. 5 provides a perspective view of an emergency notification system suitable for use in the third layer shown in FIG. 3.

FIGS. 1-6 provide for a general overview of embodiments of emergency notification systems which are in the form of a badge holder. It should be recognized that badge holders may be designed to provide for certain aesthetic appearance (including overall shape, color, and style) and may also include company identifiers and the like printed or embossed on their surface. An embodiment of such an identifier is shown in FIG. 5, for example. These aesthetic elements do not effect the operation of the system, but may alter the relative location of components from those depicted to have them fit into the desired structure as would be understood by one of ordinary skill in the art.

The term "computer" as used herein describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smartphones, tablet computers, server farms, hardware appliances, minicomputers, mainframe computers, video game consoles, handheld video game products, and wearable computing devices including, but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

Those of ordinary skill in the art also appreciate that some devices which are not conventionally thought of as "computers," nevertheless exhibit the characteristics of a "computer" in certain contexts. Where such a device is performing the functions of a "computer" as described herein, the term "computer" includes such devices to that extent. Devices of this type include, but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including, without limitation, virtual processors, or by the use of run-time environments, virtual machines, and/or interpreters. Those of ordinary skill in the art recognize that software can be wired or embedded into hardware, including, without limitation, onto a microchip, and still be considered "software" within the meaning of this disclosure. For purposes of this disclosure, software includes, without limitation: instructions stored or storable in hard drives, RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory. Throughout this disclosure, terms used herein to describe or reference media-holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including, but not necessarily limited to, a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

For purposes of this disclosure, there will also be significant discussion of a special type of computer referred to as a "mobile communication device" or simply "mobile device". A mobile communication device may be, but is not limited to, a cellular phone, a smartphone, tablet PC, e-reader, satellite navigation system ("SatNav"), fitness device (e.g. a Fitbit™ or Jawbone™) or any other type of mobile computer, whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network. A mobile communication device will almost always include its own power supply which is commonly in the form of a rechargeable battery.

For purposes of this disclosure, the term "positioning system" is meant to include any system that can provide absolute or relative position within any location area. It will typically be in the form of a satellite positioning navigation system, a beacon system, or a dead-reckoning system. Generally, any satellite positioning system known to one of ordinary skill in the art is contemplated including, but not limited to, the Global Positioning System (GPS), the Russian Global Navigation Satellite System (GLONASS), the Chinese Compass navigation system, and the European Union's Galileo positioning system. Beacon systems are designed to utilize proprietary beacons which comprise specific transmitters which are placed by the designer of the positioned system to provide relative position relative to the beacons. Such beacon systems are often utilized for indoor positioning where satellite signals may be blocked or weak. Beacon systems do not provide absolute position in many cases, but provide relative positioning to the locations of the beacons and the location of those beacons can then be specifically known. Dead reckoning systems compute location based on movement from a point of known location and include such systems as gyroscopes and the like.

FIGS. 1 through 4 provide for various views of an embodiment of a badge holder (100) which is designed to incorporate an emergency notification system (200) as part of its structure. The badge holder (100) will typically include a badge sleeve (not shown) for holding a pass or badge and a clip (103) for holding the badge sleeve or the badge directly. The badge sleeve will typically comprise a sleeve formed of two layers of usually transparent or translucent material such as clear plastic. In an alternative embodiment, the front layer may be translucent and the back layer opaque or vice versa. A user will typically place a badge into the sleeve so that relevant portions of the badge are visible through the translucent layer for visual review by another user. In other embodiments, the badge may not include identifying information directly, but is simply a form of electronic "key" or the like to allow the holder access to certain areas. In such a case, the sleeve may be eliminated at the clip (103) may attach to the badge directly of the sleeve may be entirely opaque.

The badge will typically comprise visual material such as a photograph and a name indicator. The badge may also have a visual indicator of an access status or similar concept. The badge will also typically include machine-readable material, such as but not limited to, a bar code which would be visible to an optical scanner through the translucent layer. Alternatively, the badge may include a technology that does not require optical reading such as an Infra-red (IR), Bluetooth™, or similar transmitter for proximity detection of the badge. If these later technologies are used, visual interrogation of the badge may be unnecessary and all badges in the same facility may actually appear effectively identical, but have specific electronic or machine communicable characteristics.

It should be recognized that the badge can incorporate a large number of different features depending on the specifics of how it is to be used. For purposes of this disclosure, the important aspect is that the badge serves as an identifier of the associated user and will generally be used to allow the associated user to have access to particular parts of a workplace via any means or method of interrogation. As such, it needs to be readily accessible to the associated user while the user is in the workplace and typically may need to be visible on or about the user's person the vast majority of the time they are moving within the workplace (if not at all times they are in the workplace). This will allow for their identity to be regularly verified and for them to utilize the badge for access whenever necessary.

In the embodiment of FIGS. 1-4, the badge sleeve with a badge placed therein is placed on the clip (103) of a badge holder (100) designed to incorporate a retractable badge reel (101). The badge holder (100) will typically be attached to a belt, pocket, bag or other object and allows the badge sleeve and badge to be extended from the main body (107) of the badge holder (100) while remaining attached to a cable (109) or similar object.

Figure 1:
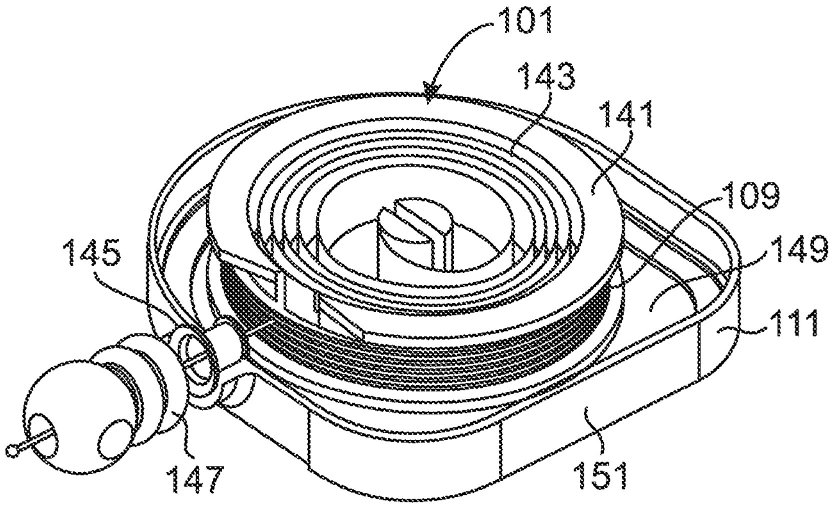
FIG. 1 provides a perspective view of an embodiment of the first layer of a badge holder incorporating an emergency notification system in a retractable badge reel.
Figure 2:
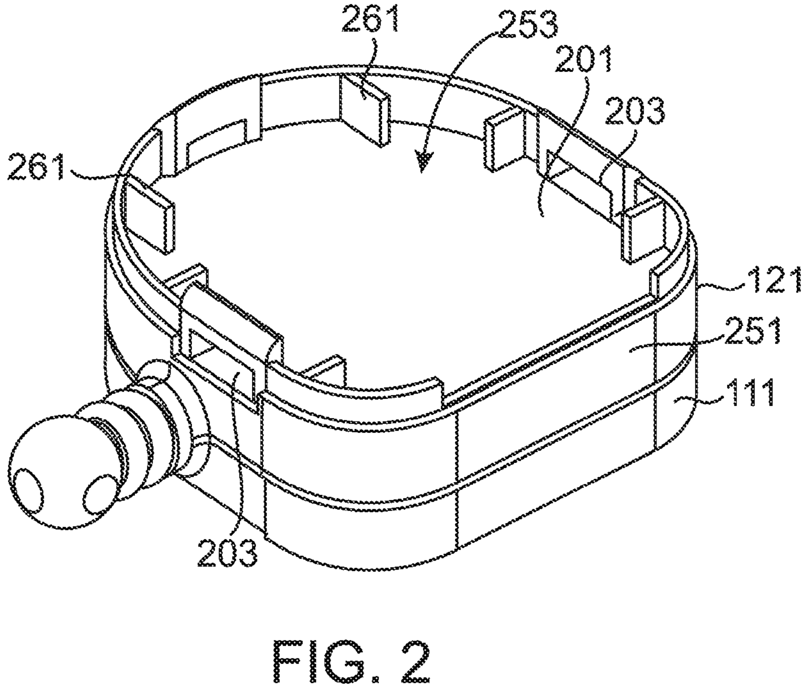
FIG. 2 provides a perspective view of an embodiment of the first and second layers of a badge holder incorporating an emergency notification system in a retractable badge reel.

In the embodiment of FIGS. 1-4, the badge holder (100) will typically comprise three layers (111), (121), and (131) which are designed to connect together in a layered form as best shown in FIGS. 2 and 4. FIG. 1 provides for detail of the first layer (111) which includes the components of the reel mechanism (101). The first layer (111) acts as a partial case having surrounding side walls (151) and a base wall (149). The reel (101) comprises a spindle (141) which is placed on a rotary spring (143) or similar object in the spindle (141). The rotary spring (143) serves to bias the spindle (141) to a particular angular position as shown in FIG. 1. The cable (109) is wrapped around the spindle (141) generally in a direction corresponding to the direction of the bias of the spring (143). A stop (145) will typically be positioned over the cable (109) and against one of the side walls (151). The stop (145) may connect to the side wall (151) to serve to protect the first layer (111) from impact with retracting objects.

The end of the cable (109) will typically be attached to a swivel (147) which is then attached to the clip (103). The swivel (147) is not required, but allows for the clip (103) to be twisted about the cable (109) without twisting the cable (109). This allows for flexibility in positioning the badge sleeve and avoids twisting of the cable (109) and possibly creating increased tension or breakage. The swivel (147) will also provide a smoother point of impact with the stop (145) to inhibit damage to the first layer (111).

To connect to the cable (109), the badge sleeve will typically be attached to a clip (103) or similar interconnector which is attached to the swivel (147). The clip (103) will be designed to be attached to the badge sleeve (or to any other relevant object such as the badge directly). The clip (103), in an embodiment, may be readily separable from the swivel (147) (or the swivel may be readily separable from the cable (109)) to alternatively be used to connect the sleeve directly to an object of the associated user such as by attaching it to clothing, for example. However, this allows the badge to be separated from the badge holder (100) and associated emergency notification system (200), which would typically be less preferred.

The reel (101) is generally designed to hold the badge near the badge holder (100) while still allowing it to be readily moved should the badge need to be examined or scanned. In use, the badge sleeve will typically default to a position with the swivel (147) against the stop (143) and the badge holder (100) will be attached to a belt, a purse, an article of clothing, or another convenient place around the user. The user will pull on the badge sleeve and/or clip (103) against the biasing of the spring (143) which causes the spindle (141) to rotate and unwind the cable (109) from the spindle (141). This in turn allows the badge sleeve to be moved from the badge holder (100) main body (107). This is typically to allow scanning of the badge placed in the badge sleeve by placement of the badge proximate a scanner without the user having to separate the badge from the badge sleeve or separate the badge holder (100) from the object to which the badge holder (100) is attached. When the scanning is completed, the badge sleeve may simply be released so that the spring (143) biasing causes the spindle (141) to rotate and retract and rewind the cable (109), or this retraction may be controlled by the user maintaining some force on the sleeve, but less than the biasing of the spring (143).

FIG. 2 shows that the reel (101) of FIG. 1 is now encased in the case (300) by including a second layer (121) of case (300) over the first layer (111). These layers (111) and (121) may connect via any mechanism including, but not limited to, connectors such as screws or bolts, via friction such as through "snap" type connections, or via adhesives. Typically, attachment will be relatively permanent without it being expected that these two layers would be separated in normal operation. First layer (111) and second layer (121) may also be co-formed if desired and if appropriate manufacturing facilities are available. The second layer (121) serves primarily to provide an interior barrier wall (201) to separate the reel (101) of FIG. 1 from the emergency notification system (200) and also provides a partial enclosing side wall (251) for the volume (253) within the second layer (121).

FIG. 3 provides for a third layer (131) which is designed to mount the emergency notification system (200) therein and attach, such as via the spring pins (203) to mating spring holes (205) of the second layer (121) in a known fashion including, but not limited to, connectors such as screws or bolts, via friction such as through "snap" type connections, or via adhesives. While the third layer (131) may be attached to the second layer (121) in any fashion, it is typically preferred that it be a repeatedly attachable and detachable fashion so as to allow the volume (253) and the emergency notification system (200) therein to be easily accessed such as to change the battery via battery cover (211).

The third layer (131) includes a top wall (249) and the other portion of the enclosing side wall (351) to the portion of the enclosing side wall (251) of the second layer (121). Both the second layer (121) and third layer (131) will typically include mounting fins (261) which can provide both structural reinforcement and serve to hold the emergency notification system (200) in place.

FIG. 3 also includes an opening (271) in the enclosing side wall (351). The opening (271) will be positioned so as to correspond to the button (371) of the emergency notification system (200) in a fashion such that the button (371) is accessible through the opening (271). This opening (271) may be a simple hole, or may include a flexible material or other barrier to allow for the button (371) or similar device to be mechanically manipulated through the opening (271) while maintaining the integrity of the side wall (351) from liquid and/or gas entry through the opening (271).

As can be best seen in FIG. 4, once the third layer (131) is attached to the second layer (121) which has been previously attached to the first layer (111), the three layers (111), (121), and (131) form a layer cake arrangement and the three portions of enclosing side walls (151), (251), and (351) along with the top wall (249) and bottom wall (149) form a case (300). The case (300) encapsulates the reel (101) and the emergency notification system (200) placing these items internal to the badge holder (100) and protecting them from damage.

Figure 6:
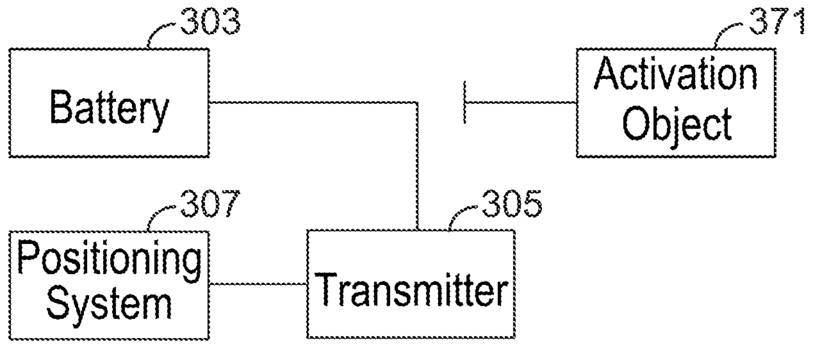
FIG. 6 provides a block diagram of the major components of an embodiment of an emergency notification system.

FIGS. 5 and 6 provide for increased detail about an embodiment of the emergency notification system (200). FIG. 5 shows the exterior of the system (200) which is primarily a case (301). The case (301) is designed to support and protect the electronic components and having the system (200) include an internal case (301) can make it easier to remove and replace the system (200) from the third layer (131) should that become necessary. The case (301) may also include a battery cover (211) (FIG. 3) to provide for easy access to, while still supporting, the battery (303) when the case (300) is opened FIG. 6 provides a general block diagram of the typical components of an emergency notification system (200) which are electronics to provide for various functions and a relatively large activation object or indicator which is the present embodiment of FIG. 5 is a depressible button (371). The button (371) is located to extend from a periphery of the case (301) so as to be easily accessible to the associated user of the system (200). While the activation object indicator in the embodiment of FIG. 5 is a button (371), it should be recognized that other objects may be used including, but not limited to, heat sensitive buttons, toggles, switches, motion or other kinetic sensing devices, or any combination of such items.

Further, while the button (371) in this embodiment is also a manual activation object where the associated user must purposefully activate it, the object need not require manual triggering and may be an indicator which is automatically triggered in other embodiments. For example, the activation object indicator can be a chemical, heat, or similar sensor, a motion sensor, or a light sensor.

The button (371) will typically be electrically interconnected with a circuit which will include the functionality of emergency notification. This functionality will typically depend on the nature of the work to which the badge is associated and which is desired by the workplace manager. In the depicted embodiment of FIG. 6, the circuit (301) will typically include a power source (303) which may be a chemical battery (rechargeable or disposable) or a power generator such as a solar panel or kinetic scavenger. The battery (303) will typically provide power to a transmitter (305) when the button (371) is depressed which will be used to indicate activation of the emergency notification function of the system (300). The transmitter (305) will typically be activated by depression of the button (303) which will serve to have the transmitter (305) send a signal via a network (whether local, global or both) to a remote computer server. That server may then respond automatically, or, more typically, will send the notification to a human user for evaluation. In the event of automatic response, the server will often notify emergency personnel of an expected type that the emergency transmission system (200) has been activated. The notified personnel may be specific to the workplace (for example, a local security officer) or may be more general in nature (for example, a city's police force).

As part of the notification process, the system (200) may send with, or as part of, the transmission, additional data. This will often include the location of the badge holder (100) as determined by an on-board positioning system (307). It may also include information obtained by other elements of the circuit (301) such as the current reading of an onboard sensor for example. The system (200) may also have other information stored in memory such as the identity of the user associated with the badge holder (100). In a still further embodiment, the system (200) can obtain information from the badge should the badge have local communication capability including the identity of the associated user to provide as part of the transmission.

In a still further embodiment, the badge holder (100) can utilize a positioning system to record its locations and/or path of travel. The positioning system in this case can be an onboard positioning system (307) or may be an external positioning system. In an embodiment of an external positioning system, the badge holder (100) may "check-in" when in it comes in range of a particular detector (for example a particular beacon or combination of beacons) to indicate that it is in a particular room or location, or when it passes through a particular portal (such as a doorway) between particular locations. This "check-in" information can then be stored at a central computer facility to provide the current location of the badge holder (100) and historical information can be used to provide a path that was taken by the badge holder (100) over any particular time period. The positioning system in this case may be designed for use in a primarily outdoor area (for example, a satellite positioning system) if the facility has large outdoor areas (for example, a strip mine or forestry operation), primarily for indoor mapping (for example, in a factory), or a mixture of both (for example, in a large manufacturing campus).

This type of "check-in" system can be used for security, for example to determine if an employee goes into an unauthorized area or simply to determine the location of a worker at any time. For example, the system can determine when an employee goes to a cafeteria, bathroom, office, conference room etc. This information can be used to monitor behavior, for example to determine if an employee may be taking too many breaks, could be used to determine facility resource use (e.g. how often is a conference room used), or could be used to trace contacts between individuals within a facility.

Contact tracing can provide a number of potentially valuable pieces of information. For example, if a particular employee makes an assertion of misbehavior against another employee, it can be determined if the two employees were actually in contact at the indicated time. Further, in the event of a need to trace user contact, such as for example, with regards to the SARS-CoV-2 (COVID-19) pandemic, it would be desirable to know what other persons an individual who has been determined to have tested positive has been in sufficient contact with to present a potential infection risk. This can allow those others to be quickly tested and/or isolated to prevent further spread. While this is particularly important with regards to highly contagious diseases such as SAR-CoV-2, it should be recognized that it can be valuable even for more common diseases. It can also be very useful if the work of the facility was such that individuals could be exposed to infectious agents or other dangerous items that could be passed on to others.

There are a variety of ways that the badge holder (100) may be used to trace contacts. In an embodiment, the location of all the badge holders (100) within a facility may be recorded and maintained for a period of time. If an individual is determined to potentially be contagious in a particular time window, the movement information of that user's badge holder (100) may be obtained. This can then be cross-referenced to determine which other badge holders (100) at the same facility were in a similar location at a similar time. For example, to determine when another individual was in the same room with this potentially contagious individual. These other individuals may then be provided with indications of potential contact with the infected user to lead them to engage in heightened protective measures or quicker testing to determine if they are potentially infected and/or contagious.

This process may be repeated for any level of contact so that the direct contacts (first level of contact) could be determined as well as the contacts of any of the group of users contacted by the initially infectious person (second level of contact). Further, to pass on contact information, the contact can be potentially anonymized for privacy protection. Specifically, the second badge holder (100) user may simply be told that they were in the same room as a potentially infectious person for a period of time long enough to be of concern. They need not be told where that location was or who the infected individual was. While it could be possible to reverse out the contact in certain circumstances, it will often require sufficient calculation and uncertainty to be effectively anonymized. Further, should this contact information be stored and nobody be determined to be infectious, the information can simply be deleted after the appropriate time window has passed.

In an alternative embodiment, instead of determining contact based on location proximity at similar time, each badge holder (100) may alternatively communicate with other badge holders (100) that it gets sufficiently close to. The time and nature of this "close pass" may be recorded at each badge holder (100). Again, should the need arise to determine which additional badge holders (100) have been close to another badge holder (100) in a particular window, the information may be obtained from the badge holders (100) at that time. This can allow for the contact information of each badge holder (100) to be stored locally with the badge holder (100) instead of at a central computer system.

While the potential tracking of user behavior or potential infectious disease spread are valuable, the ability to know the location of a particular user at any particular time can also be useful in an emergency situation. This can be particularly useful when an alarm situation is raised. In an embodiment, when a general alarm (for example, a fire alarm, earthquake alarm, or an active shooter alarm) is triggered, every user may press the button (371) on their badge holder (100). This can act as an indicator that the individual has heard the alarm and is evacuating. Quickly, a remote computer server may determine who has not triggered their button (371) which may indicate users already incapacitated by the threat and in need of immediate assistance by their failure to activate the button (371). These users' prior movement information may be obtained as indicated above to locate them and direct assistance to their last known location.

Similarly, users that have not triggered their buttons (371) may present a pattern as to the location of the threat (e.g. these represent users already overcome by smoke). Any triggering of the emergency notification system (200) prior to the general alarm may similarly be used to look for patterns to locate the threat that resulted in the general alarm. For example, if multiple emergency notification systems (200) are triggered in a particular room prior to a fire alarm in the hallway outside that room being manually activated, this information may help to locate the source of the fire as in the room as opposed to in the attached hallway or neighboring room. This information may then be used to direct other users away from the threat (for example away from a fire or active shooter) as they attempt to evacuate as well as to direct first responders toward the threat to provide a more efficient response. In complicated facilities which may have many throughways and access points, this may be able to accelerate evacuation and response. Those who may have initially triggered the alarm may also be easier to locate so that valuable information on the threat may be obtained from them.

Users that have triggered their buttons (371) (either before or in response to the general alarm) may also be monitored to make sure they are heading to an appropriate safe zone. Once a user has reached a safe zone (for example, a fire alarm rally point), the emergency notification system (200) may check-in at that location. Upon check-in, the user of that badge holder (100) may be automatically indicated at a remote computer server as safe. This can allow security teams and first responders to focus on users not currently in the safe zone rather than using a manual list of all employees at the safe zone to attempt to locate who is and is not present which can be both inefficient and inaccurate. In a still further embodiment, user movement may be tracked during an emergency regardless of if they have triggered their buttons (371).

As indicated above, one of the primary values of monitoring during an evacuation is to automatically determine if a user is in a safe zone. For example, in the event of a fire, active shooter, or chemical spill, their may be rally points both inside and outside the building which, when a user has entered, can be considered safe. However, someone taking a manual roll call typically must be in the same safe zone as the individual to verify the individual's presence there. This can be a major issue as the one taking roll call may be in a different safe zone than normal, or individuals leaving an actual emergency may have gone to a different safe zone than normal. Both of these can result in errors on the roll as to who is safe. In various embodiments of the present system and methods, roll calls at all locations may be automated and information as to the status of those in any particular area may be shared to get a more accurate picture and may provided to emergency personnel in real-time or near real-time to allow them to better respond to those in danger.

Figure 7:
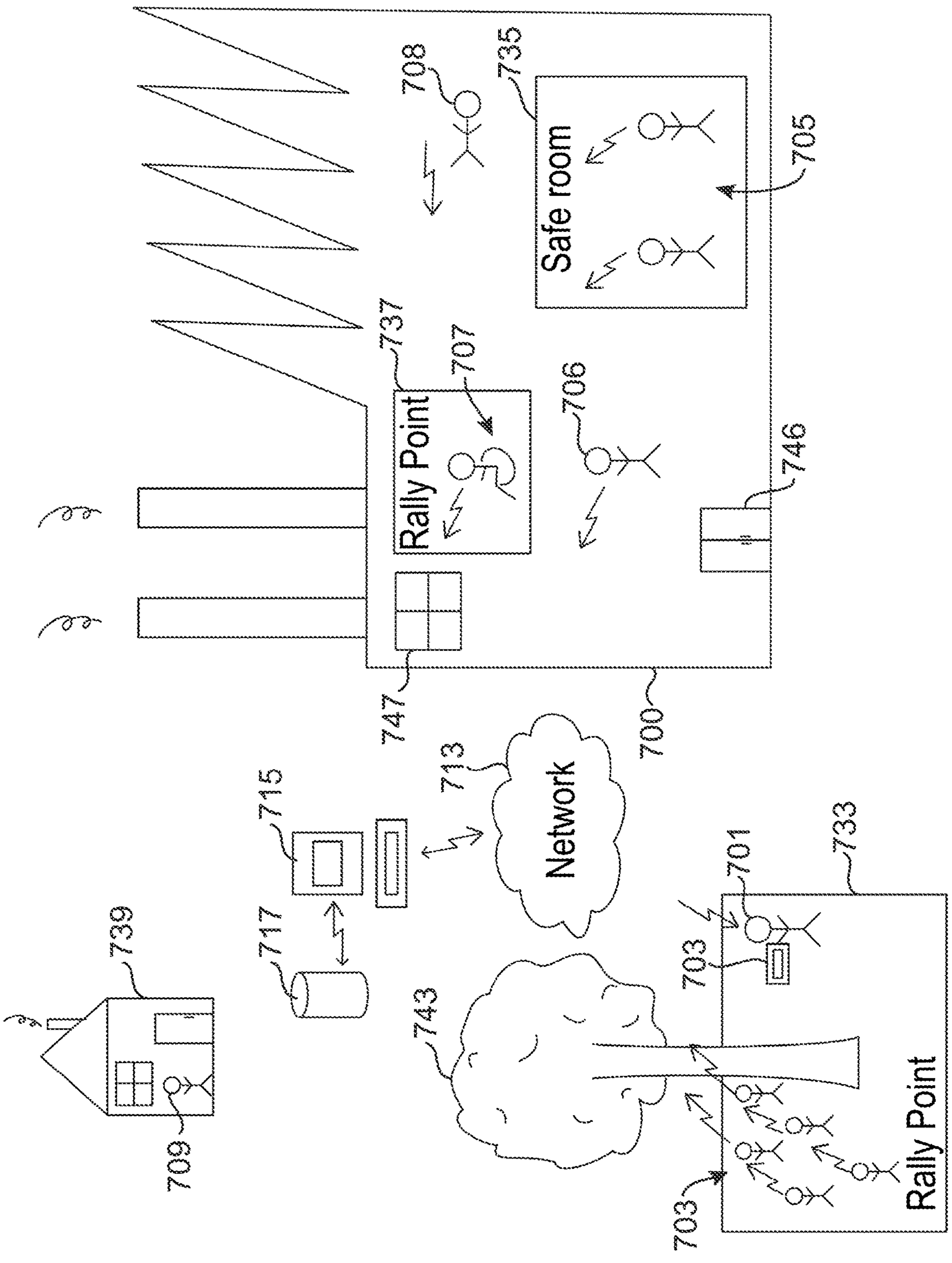
FIG. 7 provides a general block diagram of an embodiment of using badge holders including emergency notification systems to automate a roll call during an evacuation.

FIG. 7 provides an embodiment of such an evacuation scenario. In FIG. 7, there is an emergency in factory (700) resulting in an evacuation. A marshal (701), which is typically an employee volunteer, is tasked with roll call to make sure that all the other employees (703), (705), (706), (707) and (708) which are expected to meet at outside rally point (733) are safe. The marshal (701) has been supplied with a digital roll (in this case on a portable computer or mobile device such as a tablet computer) (711) which indicates all employees (703), (705), (706), (707), and (708) which they are responsible for today. The digital roll (711) is provided via a central server (715) via network (713) to which the badge holders (100) and various computers (711) and (715) can communicate. Employee (709) would normally be on the digital roll (711) as one expected to evacuate to outside rally point (733), but was not in the factory (700) today as they were home (739) sick.

Upon the marshal (701) arriving to their safe area, which is the outside rally point (733), the marshal (701) may load the roll (711) from the central server (715) via the network (713). The roll (711) may also be resident on their device and simply updated via the central server (715). The roll (711) indicates that employee (709) is safe as their associated badge holder (100) has not been detected in the factory (700) at all today. The roll (711) may also obtain other information via the central server (715) (such as human resources records) which may have access to database (717) to attempt to verify that the employee (709) is not in the factory (700). It should be noted that the badge holder (100) associated with employee (709) will typically not be checking in to indicate it is safe, it has simply not been detected at all. However, in an alternative embodiment, it may check in remotely from the home (739) to verify its location.

Meanwhile employees (703) have entered the outside rally point (733) as they have left the building. As the employees' (703) badge holders (100) are detected as at the rally area (733) (e.g. by being in proximity to a beacon located in tree (743)) they are automatically checked off of the roll (711) as safe. During this time, however, the marshal (711) has recognized that employees (705), (706), (707), and (708) have not checked in and the amount of time it was expected for them to reach rally point (733) has been exceeded. However, via the network (713), the badge holders (100) of employees (705) have transmitted that they are within a safe room (735) within the factory that is provided specifically for emergencies such as this. Thus, the marshal (701) also knows that they are safe and have been checked off the roll (711) even though the marshal (701) cannot directly see them.

Similarly, the badge holder (100) of employee (707) indicates that employee (707) is at an internal rally point where assistance is to be provided in emergencies. In this case, employee (707), who utilizes a wheelchair, is on an upper floor and cannot get down the stairs and the elevators have shut down due to the emergency. This is different than normal as employee (707) would normally have been on the first floor and able to evacuate to rally point (733)). They have, therefore, gone to a known alternate rally point (737) by a window (747) and staircase where they can be easily located and assisted by first responders.

The employee (707) is not only known to be at rally point (737), but the marshal (701) and the roll (711) know that the employee (707) is at the alternate rally point (737) which is not their normal rally point and requires assistance to further evacuate. Thus, when first responders arrive, they can quickly go to rally point (737) to assist employee (707) even though employee's (707) presence there was not expected. First responders may assist at rally point (737) while not checking other alternate rally points (e.g. those which may be on intermediate floors) as employee (707) may be the only individual indicated to be at any interior rally point. This can greatly assist in first responders reaching individuals in need of assistance at such rally points as they know specifically which indoor rally points (737) currently include individuals in need of assistance.

Two other employees (706) and (708) are not currently at a known rally point or otherwise safe. The badge holder (100) of employee (706) indicates that they are still within the factory. However, it also indicates that they are currently moving, but are taking longer to exit than is expected. The central server (715) in this scenario may compare their expected location against their expected route from database (717). In this embodiment, the employee (706) is off the expected route. This may indicate that they were in a different location than normal when the evacuation began are may have become disoriented. In this scenario, the central server (715) may have the badge holder (100) utilize an onboard speaker or similar structure to communicate with the employee (706) to instruct them how to reach door (746) or safe room (735). Alternatively, the factory (700) may include a communication system (such as an intercom or escape lighting) which may be used to direct employee (706). In a still further embodiment, as the immediate location of employee (706) is known, as soon as first responders arrive, they may be directed to employee's (706) location.

As opposed to employee (706) the badge holder (100) of employee (708) is not moving and is still within the factory (100). Alternatively or additionally, they also may not have activated their button (371). Their lack of movement while outside a safe area and/or their failure to activate their button (371) may be used to infer that employee (708) is incapacitated and may be in more active danger compared to employee (707) or (706) which are also still inside and not actively "safe" like employees (705). Again, communication systems may be used to try and interact with employee (708). This may be used to provide additional information about employee (708). For example, their badge holder (100) could utilize onboard communication to request they click their button (371) if they are able, or to use the button to indicate a result to yes/no questions. An onboard microphone or other sensor may also be activated to obtain additional information Employee (708) may also be the first target for first responders to attempt to reach upon arrival onsite due to their potential danger. Their location may also provide first responders with additional danger information. For example, in an active shooter situation, the presence of incapacitated employee (708) may provide an indication of the location or path of the active shooter.

While FIG. 7 illustrates much of the value of the system during an actual emergency evacuation, it should be recognized that most locations also nm regular evacuation drills. In these drills, the badge holders (100) may be tracked for compliance with the drills (e.g. that all employees are participating). Similarly, data on the effectiveness of the drill may be captured such as in database (717). This can be highly beneficial in evaluating the effectiveness of emergency response or from improving it in the future. For example, if data is collected during a drill which shows a clear bottleneck point for people leaving the building, additional exits may be installed near that point. Similarly, if routes from certain locations are much slower than desired, additional routes may be provided.

The system can also determine the general expected paths of evacuation during a drill as well as the amount of time it takes individuals to evacuate once they detect the commencement of the drill. For example, triggering of a button (371) can be used to commence the evacuation time calculation with the end being when the badge holder (100) reaches the expected rally point. This information can be used during an actual emergency by also accessing database (717) to see deviation from expected paths and times as indicated above. This can provide indications of the locations of dangers, for example, and can be used to determine which individuals have not reached their rally point because they are not expected to have yet versus those that should be there and may have evacuated to a different location or may be unable to evacuate as expected. It may also be used to alter evacuation routes and to notify first responders of likely evacuation time and paths before or during an actual emergency.

While the above embodiments provide for the system (200), to communicate with external computer systems fairly directly (e.g. such as through a network (713) to portable computer (711) and/or central server (715)), in a still further embodiment, the system (200) may not directly interact with a remote server via a network. Instead, the system (200) may access an associated user's mobile device which may be near to the badge holder (100) and also carried by the associated user. The system (200) may then transmit directly to the mobile device and the mobile device may utilize a transmitter in this mobile device to transmit the information to the network. This can allow for the system (200) to have a reduced power requirement in transmission compared to if it were to access the network directly and to potentially have greater range. Further, it can also allow the mobile device to add additional information to the transmission from its on-board electronics and memory.

While the embodiment of the badge holder (100) above utilizes a retracting reel (101), it should be recognized that this can be removed in alternative embodiments and the badge holder (100) may comprise just the emergency notification system (200) which may be encased in an additional case (300) or simply have the clip (103) attached directly thereto. The emergency notification system (200) may alternatively be designed to be attached to a lanyard, although that is optional, to be worn around the neck or may be connected via an attached clip or similar object to clothing or the like. The lanyard (105) is typically simply a loop of material, such as, but not limited to, ribbon or fabric, which can be used to carry the badge sleeve around the neck in the manner that is well known to a person of ordinary skill in the art.

In a still further embodiment, the badge sleeve may also include or carry an emergency notification system (200). In such an embodiment, because a badge is often designed to need optical accessibility to only one side, the circuitry (e.g. elements (303), (305), and (307)) forming the primary communication portion of the emergency notification system (200) may be positioned behind the badge. In an alternative embodiment, the circuit may be designed to be positioned around the periphery of the badge sleeve and, thus, may frame or partially frame the badge with circuitry. To accommodate this the sleeve may be of the type more typical to a picture frame with a thickened periphery compared to the viewing area in the center. The button (371) would typically be located in the periphery of the sleeve as well so as to be easily accessible.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "spherical" are purely geometric constructs and no real-world component or relationship is truly "spherical" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A system for locating a badge holder, the system comprising:
- a computer server;
- a badge holder including:
  - a clip and cable for attaching said badge holder to a badge;
  - a housing including three separate layers;
    - a first layer of said three separate layers including a top wall and surrounding side walls partially enclosing:
      - a positioning system for determining a location of said badge holder, said location being remote from said computer server; and
      - an emergency notification system including:
        - an activation object for activating said emergency notification system; and
        - a transmitter;
    - a second layer of said three separate layers providing a continuous barrier wall and surrounding side walls partially enclosing a hollow interior volume separating said first layer of said three separate layers from a third layer of said three separate layers; and
    - said third layer of said three separate layers including a bottom wall and surrounding side walls partially enclosing;
      - a reel for allowing said clip to be moved away from said badge holder and automatically retract said cable toward said badge holder without said movement activating said emergency notification system;
    - wherein each layer of said first layer, said second layer, and said third layer is connected to at least one other of said first layer, said second layer, and said third layer to form said housing;
  - wherein, said transmitter wirelessly transmits said location of said badge holder to said computer server only upon said activation object activating said emergency notification system; and
  - wherein said surrounding side walls of said first layer, said second layer, and said third layer along with said top wall and said bottom wall form a case enclosing said reel, said positioning system, and said transmitter.

2. The system of claim 1 wherein said activation object is manually operated.

3. The system of claim 1 wherein said activation object is a mechanical button.

4. The system of claim 1 wherein said activation object is an indicator.

5. The system of claim 1 wherein said activation object is a sensor.

6. The system of claim 1 further comprising a badge sleeve on said clip.

* * * * *